Oct. 15, 1968 R. ANDERSON 3,405,931
OPERATING TABLE HAMMOCK
Filed April 19, 1966 5 Sheets-Sheet 2
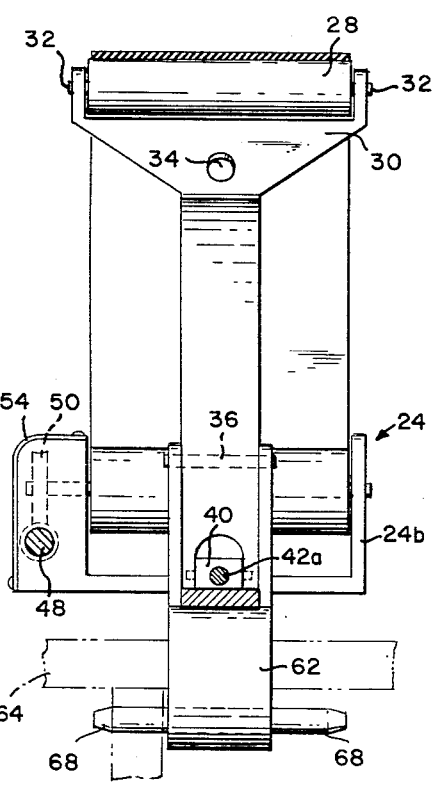
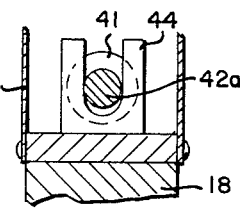
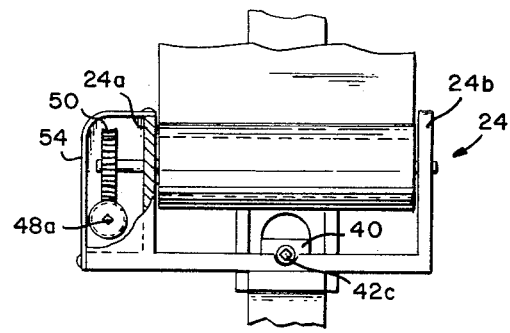
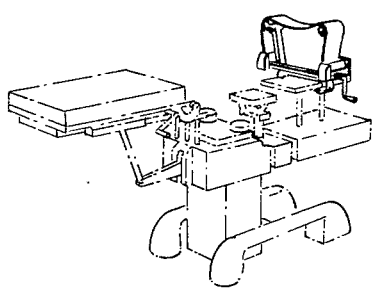
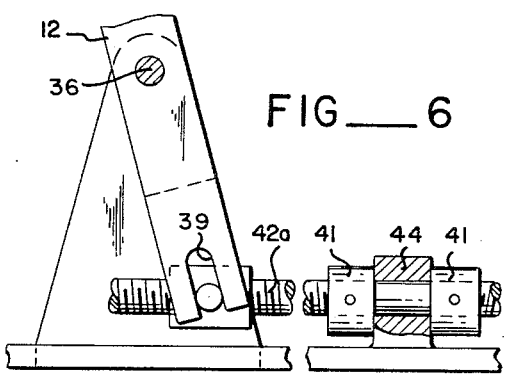
ROGER ANDERSON
INVENTOR.
BY *Seed & Berry*
ATTORNEYS

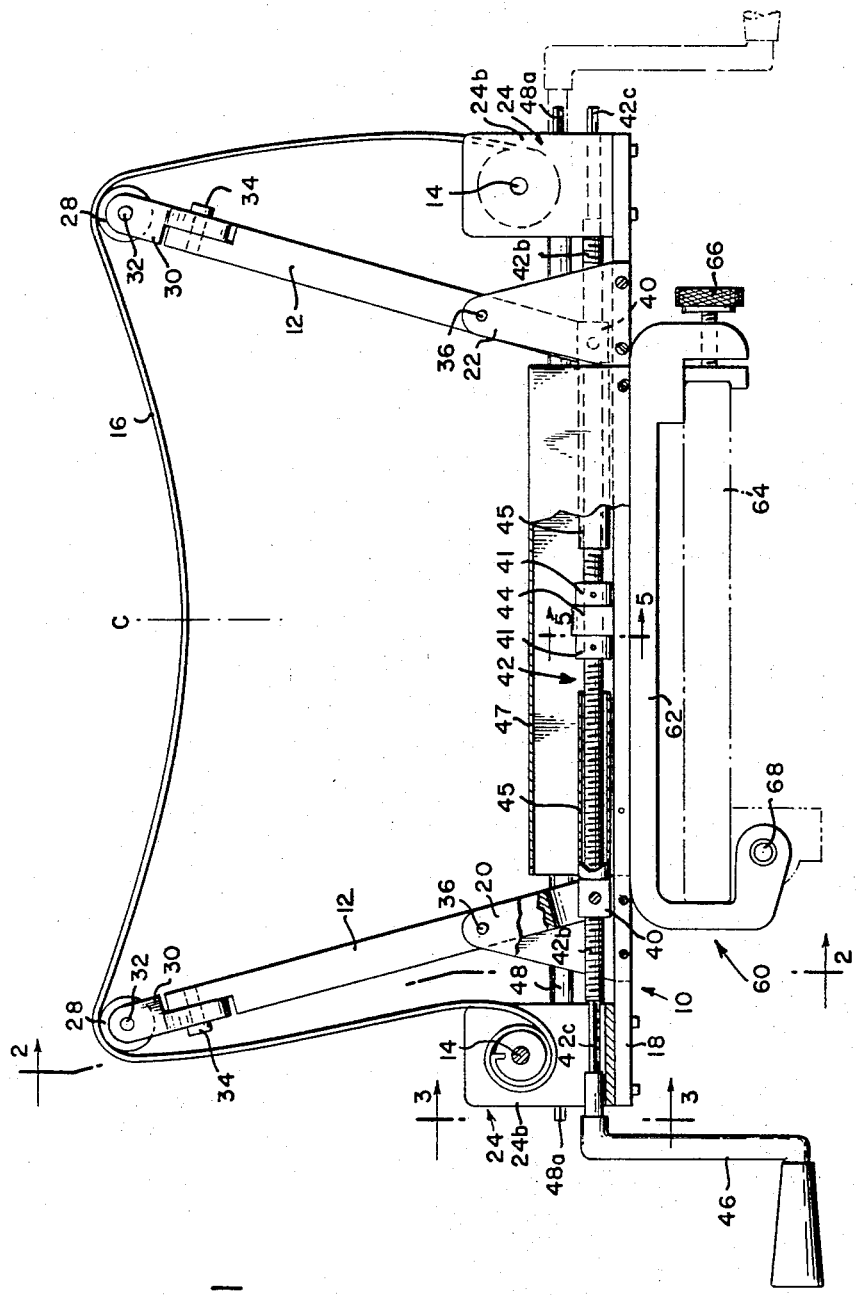
FIG__1
ROGER ANDERSON
INVENTOR.
ATTORNEYS

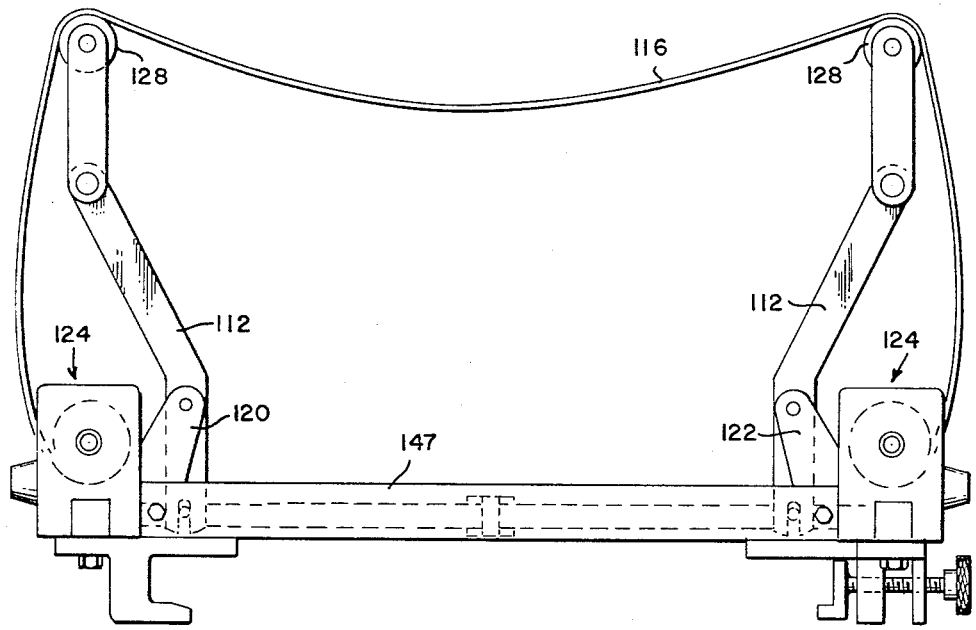
FIG__7
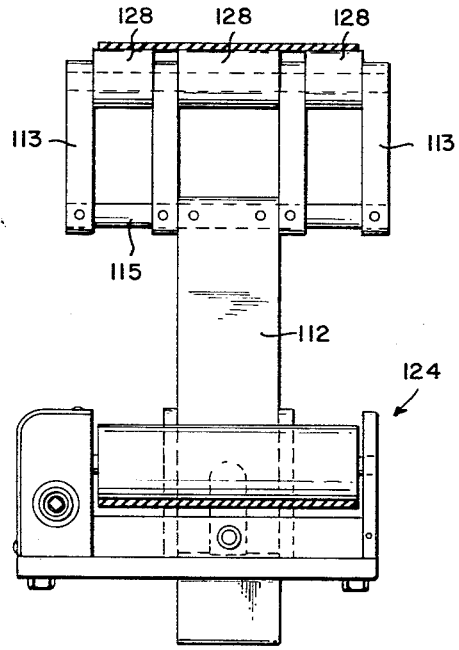
FIG__8
ROGER ANDERSON
*INVENTOR.*
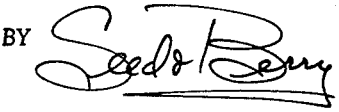
ATTORNEYS Oct. 15, 1968  R. ANDERSON  3,405,931
OPERATING TABLE HAMMOCK
Filed April 19, 1966  5 Sheets-Sheet 4
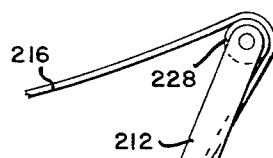
FIG__9
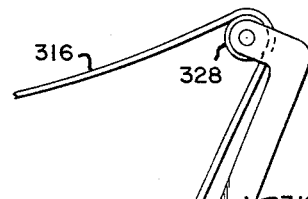
FIG__11
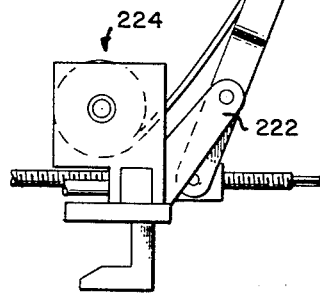
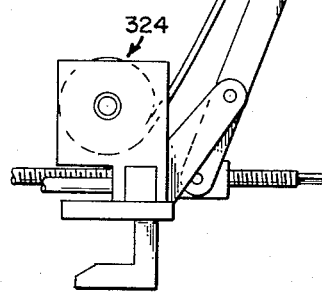
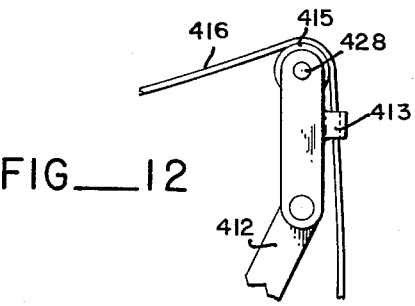
FIG__12
FIG__10
FIG__13
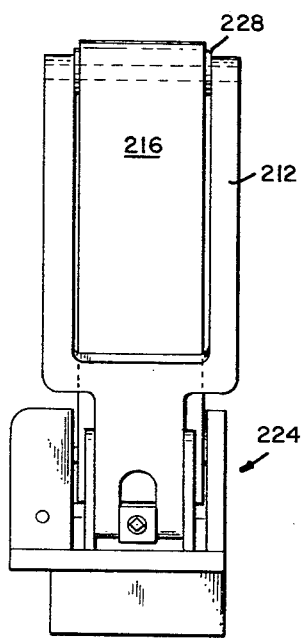
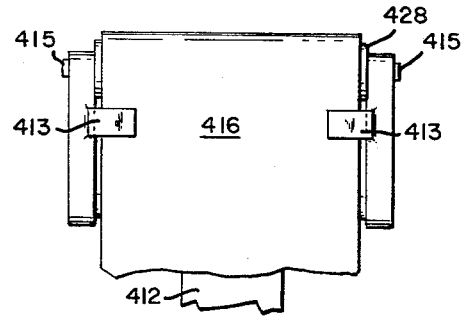
ROGER ANDERSON
INVENTOR.
BY *Seed & Berry*
ATTORNEYS

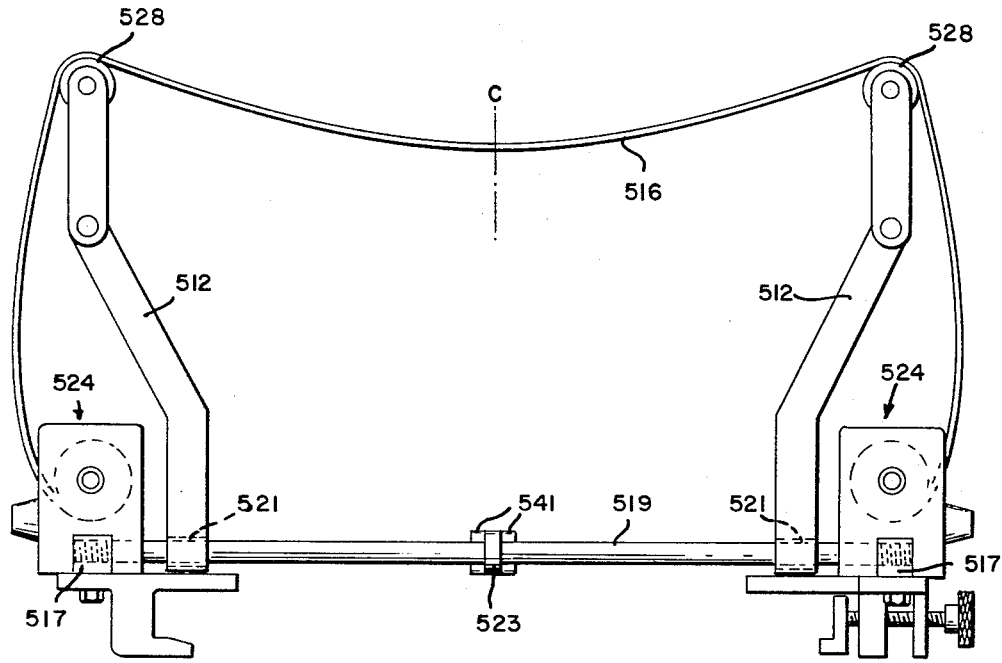
FIG. 14
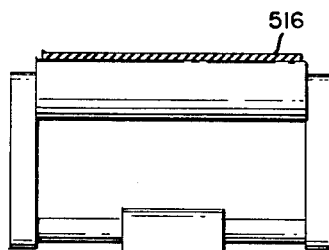
FIG. 15
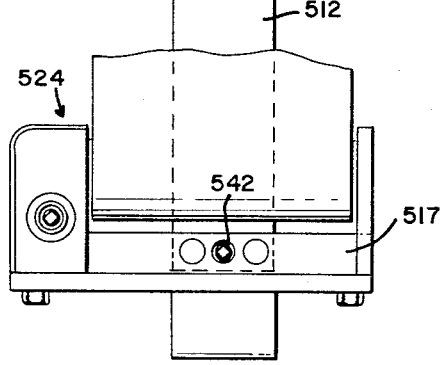
ROGER ANDERSON
INVENTOR.
ATTORNEYS United States Patent Office 3,405,931
Patented Oct. 15, 1968

3,405,931
OPERATING TABLE HAMMOCK
Roger Anderson, 5421 1st Ave. S.,
Seattle, Wash. 98108
Filed Apr. 19, 1966, Ser. No. 543,652
11 Claims. (Cl. 269—328)

ABSTRACT OF THE DISCLOSURE

An adjustable operating table hammock is provided comprising a frame adapted to be fitted onto an operating table and a pair of arms movably connected to the frame and having outer belt bearing members with a support belt extended over the outer belt bearing members and rotatably connected at opposite ends to support belt shafts mounted by the frame. The outer ends of the arms are movable toward and away from one another in unison and the support belt shafts are rotatable in unison, such that the support belt may be uniformly raised and lowered by rotating the support belt shafts in unison or by moving the outer ends of the arms toward or away from one another.

---

This invention relates to improvements in surgical and orthopedic operating tables. More particularly, this invention relates to an improved hammock for operating tables.

Hammocks have been used to provide lateral chest support and lateral pelvic support when a patient is to be suspended on an operating table in a lateral or sidewise position. One type of hammock presently in use employs a supporting belt that has limited adjustability and cannot be adjusted at all once a patient has been placed in the hammock and thus proper hammock adjustment to fit each patient is often difficult to achieve. Hammocks in use today also cannot be satisfactorily used to accommodate large adults and small children and to support them at a satisfactory operating height inasmuch as such hammocks are either too wide to prevent body tilting back and forth or too tight to permit unrestricted respiration. Also such hammocks are not suitable to raise or to lower a body to an appropriate height for every patient.

A primary object of this invention is to provide a hammock for an operating table that can easily accommodate adults and children. Another object is to provide such a hammock that can be easily raised or lowered when supporting a patient without rolling the patient.

These and other objects and advantages will become apparent from the following description in conjunction with the accompanying drawings, of which:

FIG. 1 is a side elevation view, partially in cross-section, of one embodiment of the hammock of this invention;

FIG. 2 is an end view taken along the line 2—2 of FIG. 1;

FIG. 3 is an end view, partially in cross-section, taken along the line 3—3 in FIG. 1;

FIG. 4 is a perspective view of an operating table, in phantom, and the hammock of this invention attached thereto;

FIG. 5 is a view taken along the line 5—5 in FIG. 1;

FIG. 6 is a detail elevation view of the connection between the hammock arms and the means for pivoting the hammock arms;

FIG. 7 is a side elevation view of another embodiment of the hammock of this invention;

FIG. 8 is an end view of the FIG. 7 embodiment;

FIG. 9 is an side elevation view of one embodiment of a hammock arm for use in this invention;

FIG. 10 is an end elevation view of the FIG. 9 embodiment;

FIG. 11 is a side elevation view of another embodiment of a hammock arm for use in this invention;

FIG. 12 is a fragmentary side view of the upper end section of a hammock arm illustrating an embodiment for centering the hammock belt;

FIG. 13 is a fragmentary end view of the FIG. 12 hammock arm;

FIG. 14 is a side elevation view of still another embodiment of the hammock of this invention; and FIG. 15 is an end view of the FIG. 14 embodiment.

This invention is an adjustable hammock which comprises a frame adapted to be fitted onto an operating table, a pair of arms movably connected to the frame and having belt bearing members mounted on the frame, a pair of support belt shafts connected to the frame, and a support belt connected to the shafts and extending between the arms and across the belt bearing. Means are provided to move the outer ends of the arms toward and away from one another in unison. Means are provided to rotate the support belt shafts in unison such that the support belt is uniformly rolled onto and unrolled from the support belt shafts.

The embodiment shown in the FIGS. 1–6 comprises a frame 10, paired upstanding arms 12—12, support belt shafts 14—14, and a support belt 16. The frame comprises a base 18, two pair of upstanding brackets, 20 and 22, either attached to the base or formed as a part thereof, the brackets of each pair being aligned on opposite sides of the base so that the arms can fit therebetween as shown, and two shaft support brackets, 24—24, either connected to opposite ends of the base or formed as a part thereof and having upstanding members, 24a and 24b, to which the shafts 14—14 are rotatably pinned as shown.

The arms 12—12 are rectangular bars which mount belt bearing members in the form of roller members 28—28 at their outer ends by means of yokes 30—30, the roller members being rotatably pinned to the legs of the yokes by pins 32—32 as shown. The yokes may be integral with the arms or may be independent elements pinned thereto by pins 34—34 as shown to permit slight transverse pivoting of the roller members providing for slight pivotal movement of the roller members can be advantageous in permitting a proper orientation of the support belt in relation to the body section being supported thereby. The lower portion of each arm is inserted between one of the upstanding support bracket pairs and pivotally connected thereto by pins 36—36 which extend through the respective bracket pair and arm as shown.

The drive means for pivoting the arms in unison comprises threaded blocks 40—40 pivotally connected to the lower ends of arms 12—12. The lower ends of the arms are yoke-shaped as seen in FIG. 3 and the blocks 40—40 are pivotally carried between the legs of the yokes as shown. The yoke legs are preferably each provided with a longitudinal slot, as at 39 in FIG. 6, so that the yoke legs can ride up and down on the pins 40a of the blocks 40—40 as the arms are pivoted back and forth. The blocks 40—40 are threaded onto an elongated member 42 which has reverse threaded screw sections 42a and 42b carried by a bearing member 44 in the center thereof. Alternately, the yoke legs could be pinned directly to the blocks 40—40 in which case bearing member 44 would have to be U-shaped as shown in FIG. 5 so that the member 42 could shift up and down as the hammock arms pivot back and forth. Each end of the member 42 is provided with a wrench head end 42c adapted to fit within a removable wrench handle 46. The blocks 40—40 are positioned at equal distances from the ends of member 42 such that the arms 12—12 extend upwardly at equal angles from horizontal with respect to the ends of the frame as shown. Thus, by rotating member 42 from either end by wrench handle 46, the arms will pivot in unison and hence the roller members mounted on top of the arms will move toward and away from one another in unison also. A housing 47 is connected to the base 18 and extends between arms 12—12 to enclose the center section of screw member 42. The degree to which the arms can be outwardly inclined is limited by tubular stops 45—45 connected to the blocks 40—40 as shown which contact the bearing members 41—41.

The drive means for rotating the support belt shafts 14—14 in unison comprises an elongated rod 48 having screw threads that mesh with worm gears 50—50 mounted on pins which support the shafts 14—14. Each end of rod 48 is provided with a wrench head end 48a adapted to fit within the removable wrench handle 46 as shown in phantom in FIG. 1. Each worm gear assembly is enclosed by a housing 54 connected to the respective shaft support brackets 24—24. The support belt shafts are adapted to have the support belt 16 connected thereto so that rotation of the rod will wind or unwind the support belt uniformly on both shafts 14—14.

The embodiment shown in FIGS. 1 and 2 is provided with a mounting 60 to position the hammock on an operating table as shown in FIG. 4. The mounting comprises a member 62 of generally U-shaped configuration adapted to rest on an operating table top 64. One leg of the U-shaped member 62 is provided with a screw bolt 66 adapted to be inserted into the side of the top 64. The other leg is fitted with dowels 68 on either side that are adapted to fit into a member provided therefor on the underside of top 64. This type of mounting permits attaching the hammock to a suitable table top section by first fitting one of the dowels 68 into a suitable opening provided therefor, pivoting the hammock about the confined dowel down onto the top 64, and then attaching screw bolt 66 to the top 64. By providing dowels on opposite sides of member 62, as shown, the hammock can be attached from either side of a table top 64 that has provision for receiving the dowels on both sides thereof.

FIGS. 7 and 8 depict a hammock embodiment of this invention which is somewhat more compact than the FIG. 1 embodiment, somewhat easier to install on an operating table, and also somewhat more adaptable for use with various sizes of support belts. The arm support brackets 120 and 122 are inclined inwardly and the arms 112—112 are outwardly offset such that the belt shaft support brackets 124—124 can be positioned closer to the arm pivot points and such that the frame can be shortened without limiting the overall useful width of the hammock. Thus, the hammock of this embodiment need only be slightly wider than the operating table to which it attaches. Also, the support belt is wound onto the support belt shafts 114—114 for contra-rotational winding as shown so that the brackets 124—124 can be located even closer to the arm pivot points without belt-adjusting interference caused by the support belt rubbing against the arms.

As best seen in FIG. 8, the upper end of each arm 112 has several bearing member support fingers 113 connected thereto by pin shafts 115 and held by set screws 117. Between the upper ends of the fingers, bearing members sections in the form of rollers 128—128 are rotatably pinned. By employing wider or narrower roller sections, or one or fewer rollers, wider or narrower support belts can be easily accommodated.

FIGS. 9 and 10 depict an arm embodiment which permits the belt shaft support brackets 224 to be located interiorly of the arms 212. The upper end of each arm is formed as a yoke with the belt bearing member 228 positioned across the top of the yoke such that the support belt 216 can pass over the bearing member and back through the arm to the brackets 224 as shown. The depth of the yoke is sufficient to permit the support belt to pass unobstructed to the brackets. To provide a compact hammock, each arm support bracket (bracket 222 shown) is inclined outwardly.

FIG. 11 depicts an arm embodiment which also permits the belt shaft support brackets 324 to be located interiorly of the arms 312. The upper end of the arm is provided with inwardly extending sections which mount the bearing member 328 offset from the arm such that the support belt 316 can pass over the bearing member and downwardly to the bracket 324 as shown.

FIGS. 12 and 13 depict an arm embodiment wherein a tab 413 is formed in each side of the upper arm section. These tabs extend inwardly toward one another for a short distance and are spaced outwardly from the respective arm section as shown. The support belt 416 is able to freely pass inwardly of the tabs and is thus sufficiently restrained that it cannot slip off of the bearing member 428. Some such support belt restraining or guiding element would preferably be formed or affixed to each side of both hammock arms in all of the embodiments disclosed herein.

FIGS. 12 and 13 also depict pin extensions 415 in the upper end section of each side of the arm. When a hammock is to be employed as a pelvic support, it could be desirable to have such pin extensions on both hammock arms so that a crotch support strap could be connected between the hammock arms when counter traction is required during an operation. Such pin extensions would preferably be provided on both sides of both hammock arms so that a crotch support strap could be employed regardless of the orientation of the hammock on the operating table.

FIGS. 14 and 15 depict an embodiment wherein the hammock arms 512—512 are movable longitudinally of the hammock framework in an upright position rather than pivoted as in the preceeding embodiments. Such longitudinal movement is effected by providing the lower arm sections with transverse containing cylindrical bushings 521 which receive and slide on guide rods 519—519. These guide rods are threadably or otherwise secured to end blocks 517—517 and their proper spacing maintained at the midpoint by spacer block 523. An elongated, reverse-threaded screw member 542 is threaded into each lower arm section. Each end of the member 542 is provided with a wrench head end which extends through the respective end block 517 and is adapted to fit within a removable wrench handle. The member 542 is maintained in position by stopper elements 541—541 which are pinned to the member 542 and bear on opposite sides of the spacer block 523. Thus, by rotating member 542 from either end by the wrench handle, the arms will slide toward or away from one another in unison. The outwardly offset hammock arm structure shown enables the hammock arms to be moved relatively close to one another without unduly limiting the useable width between the upper arm sections.

The hammock support belts can be raised or lowered in two ways, First, the support belt shafts can be rotated to wind or unwind the belt. Secondly, the arms can be pivoted, as in the case of the FIGS. 1, 7, 9 and 11 embodiments, or moved longitudinally of the hammock frame, as in the FIG. 14 embodiment, to raise or lower the suspended section of the belt. In either case, the center point —C— of the suspended portion of the belt will rise or fall but will not shift laterally toward one arm or the other because both support belt shafts are rotatable in unison and because both arms are pivotable in unison. Thus, the patient supported by the support belt can be raised or lowered between the arms without being rolled to one side or the other. Further, because of the adjustability of the arms, the width of belt suspension between the arms can be changed to accommodate a small child or a large adult.

If desired, a support belt can be employed which has a wide section extending between the arms and a narrower section extending over the belt bearing and around the support belt shafts. The belt need not be of uniform width as shown in the drawings. The support belt shafts can be adapted to facilitate changing belts so that belts having center sections of various widths can be easily connected to the shafts. Also, the belt bearing members could be provided as fixed, non-rotatable rods rather than as rollers.

FIG. 4 illustrates the placement of a hammock of this invention on an operating table for chest support. A pelvic support hammock would be attached to the intermediate section of the operating table between the leg section and chest section. The relative heights of the chest support and pelvic support hammocks can be adjusted by raising or lowering the operating table sections as well as by adjusting the hammock support belt.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What is claimed is:

1. An adjustable hammock adapted for attachment to an operating table which comprises a frame; a pair of upstanding arms spaced apart and connected to said frame; support belt bearing members mounted on the arms above the frame; means for adjusting said arms such that the upper ends of said arms move inward toward one another and outward away from one another in unison; a pair of rotatable support belt shafts rotatably connected to said frame below said bearing members; a support belt operatively connected to said shafts and extending between said arms across said bearing members; and means for rotating said shafts in unison.

2. An adjustable hammock according to claim 1 wherein said frame comprises a base, upstanding brackets attached to said base to pivotally connect said arms to said frame, and shaft support brackets mounted on the ends of said base for rotatably connecting said support belt shafts to said frame.

3. An adjustable hammock according to claim 1 including yoke members pinned to the outer end of said arms for slight pivotal movement, said bearing members comprising rollers rotatably pinned to said yoke members.

4. An adjustable hammock according to claim 1 wherein said arms are pivotally connected to said frame; and wherein said means for adjusting said arms in unison comprises threaded blocks pivotally connected to the inner ends of said arms, and an elongated screw member having reverse threaded screw sections threaded through said blocks, the ends of said member having wrench heads formed therein.

5. An adjustable hammock according to claim 1 wherein said means for rotating said shafts in unison comprises a pair of gear assemblies each connected to one of said shafts and interlocked with the other to provide for concurrent rotation of said shafts.

6. An adjustable hammock according to claim 4 wherein the lower end of each arm encloses the respective block and is provided with side slots, and wherein said blocks are provided with pins which ride up and down in the side slots as the arms are pivoted back and forth.

7. An adjustable hammock according to claim 1, wherein said arms are outwardly offset.

8. An adjustable hammock according to claim 1 wherein said support belt shafts are located exteriorly of said arms.

9. An adjustable hammock according to claim 1 wherein said support belt shafts are located interiorly of said arms.

10. An adjustable hammock according to claim 1 wherein the upper ends of said arms are provided with a plurality of upwardly extending fingers and wherein bearing member sections extend between the upper ends of said fingers.

11. An adjustable hammock according to claim 1 including guide members, said arms being slidably fitted on said guide members; and wherein said means for adjusting said arms in unison comprises an elongated screw member having reverse threaded screw sections threaded into lower section of said arms.

References Cited

UNITED STATES PATENTS

| 924,075 | 6/1909 | Johnson | 5—84 X |
| 3,294,336 | 12/1966 | Rotter | 242—75.5 X |

FOREIGN PATENTS

| 459,832 | 9/1913 | France. |

ROBERT C. RIORDON, *Primary Examiner.*

J. F. McKEOWN, *Assistant Examiner.*